J. E. FINLEY.
Churn-Dashers.

No. 158,364.  Patented Jan. 5, 1875.

Attest:  
Wm. H. Blodgett  
M. Gardner

Inventor:  
John E. Finley

UNITED STATES PATENT OFFICE.

JOHN E. FINLEY, OF MEMPHIS, TENNESSEE.

IMPROVEMENT IN CHURN-DASHERS.

Specification forming part of Letters Patent No. 158,364, dated January 5, 1875; application filed July 31, 1874.

*To all whom it may concern:*

Be it known that I, JOHN E. FINLEY, of Memphis, county of Shelby and State of Tennessee, have invented a new and Improved Churn-Dasher; and I do hereby declare that the following is a full, clear, and exact description of the construction and operation of the same, reference being had to the accompanying drawings and letters of reference marked thereon making a part of this specification.

The nature of my invention consists in making a churn-dasher to be used in an ordinary churn tub or jar, consisting of a flanged propeller-wheel encircled with a band in such manner that the same will be caused to revolve when the dasher is moved back and forth through the milk.

The object of my invention is to make a dasher in such a manner that the air will be carried into every part of the cream or milk, and to create an agitation by means of the revolutions of the propeller-wheel and the sharp cutting-edges of the rim, and by forcing the fluid through the holes of the rim and the funnel-shaped air-chamber at the bottom of the dasher, thus breaking the globules containing the butter, and thereby hastening the operation of butter-making.

Figure 1:
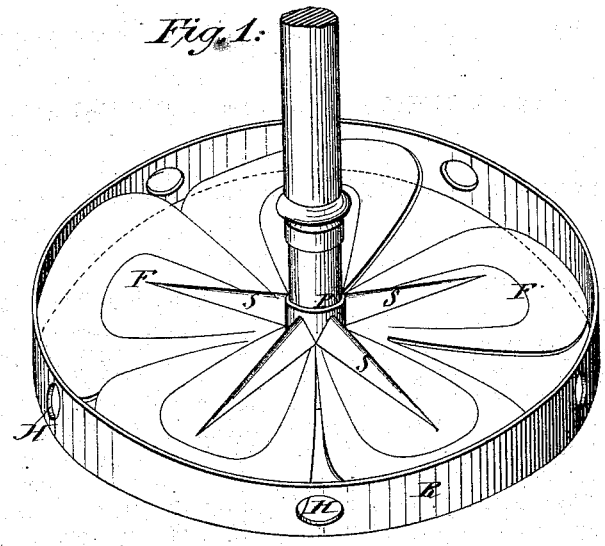
Figure 2:
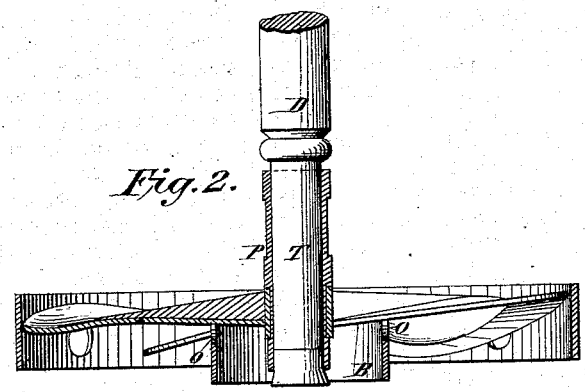

Figure 1 is a perspective view. Fig. 2 is a vertical section.

D is the handle; P, the propeller-wheel; F F, the flanges; R, the rim; H H, the holes in the rim; S S, the star-shaped brace; T, the thimble in which the handle D is secured; B, the funnel-shaped air-chamber; O O, the holes in air-chamber B. I place upon the handle D the thimble T, upon which I secure the propeller-wheel P in such a manner as to allow the same to revolve when the dasher is operated. To brace the propeller-wheel P, I place the star-shaped brace S S on the top edge of the same. I place the rim R, with perforations H H, around the propeller-wheel, so that its top and bottom present cutting-edges. I place the funnel-shaped air-chamber B, with perforations or holes O O, below the propeller-wheel in such a way as to force the cream through these openings when the dasher is operated.

What I claim as my invention, and desire to secure by Letters Patent, is—

The dasher, consisting of the propeller-wheel P F, the thimble T, the encircling rim R with holes H H, and the air-chamber B with holes O O, as shown and described.

JOHN E. FINLEY.

Witnesses:
　WM. H. BLODGETT,
　M. GARDNER.